(12) United States Patent
Ishimaru et al.

(10) Patent No.: US 12,240,211 B2
(45) Date of Patent: Mar. 4, 2025

(54) POLYESTER SEALANT FILM, LAMINATE AND PACKAGE

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 549 days.

(21) Appl. No.: 16/481,826

(22) PCT Filed: Feb. 8, 2018

(86) PCT No.: PCT/JP2018/004341
§ 371 (c)(1),
(2) Date: Jul. 29, 2019

(87) PCT Pub. No.: WO2018/150997
PCT Pub. Date: Aug. 23, 2018

(65) Prior Publication Data
US 2021/0101379 A1 Apr. 8, 2021

(30) Foreign Application Priority Data

Feb. 15, 2017 (JP) .................................. 2017-025966

(51) Int. Cl.
*B32B 27/36* (2006.01)
*B32B 1/00* (2024.01)
(Continued)

(52) U.S. Cl.
CPC ................ *B32B 27/36* (2013.01); *B32B 1/00* (2013.01); *B32B 7/027* (2019.01); *B32B 27/08* (2013.01);
(Continued)

(58) Field of Classification Search
CPC ........... B32B 1/00; B32B 7/027; B32B 27/08; B32B 27/36; B32B 2250/02;
(Continued)

(56) References Cited

U.S. PATENT DOCUMENTS 5,458,965 A 10/1995 Yoshinaka et al.
5,972,445 A 10/1999 Kimura et al.
(Continued)

FOREIGN PATENT DOCUMENTS

EP 0712719 A1 5/1996
EP 2990455 A1 3/2016
(Continued)

OTHER PUBLICATIONS

European Patent Office, Extended European Search Report in European Patent Application No. 18754704.7 (Nov. 2, 2020).
(Continued)

*Primary Examiner* — Eli D. Strah
*Assistant Examiner* — Thomas J Kessler
(74) *Attorney, Agent, or Firm* — Leydig, Voit & Mayer, Ltd.

(57) ABSTRACT

The invention provides a polyester sealant film having at least one of a heat sealing layer and a heat resistant layer, wherein each layer consists of a polyester component containing ethylene terephthalate. The polyester sealant film has (1) a heat sealing strength of the heat sealing layers of 8-20 N/15 mm; (2) a difference in reversible heat capacity ($\Delta Cp$) for the heat sealing layer of 0.5-1.1 J/g/K; (3) a $\Delta Cp$ for the heat resistant layer of 0.1 to less than 0.6 J/g/K; (4) a fold holding angle of 20-60 degrees; (5) a smaller curvature radius of 50-300 mm in a longitudinal or widthwise direction; and (6) a heat shrinkage ratio of −5% to 5% in both longitudinal and widthwise directions. The invention also provides a laminate comprising at least one layer of the
(Continued)

polyester sealant and a packaging bag comprising the laminate.

8 Claims, 3 Drawing Sheets

(51) Int. Cl.
  *B32B 7/027* (2019.01)
  *B32B 27/08* (2006.01)
  *B65D 65/40* (2006.01)
(52) U.S. Cl.
  CPC .......... *B65D 65/40* (2013.01); *B32B 2250/02* (2013.01); *B32B 2250/244* (2013.01); *B32B 2307/306* (2013.01); *B32B 2307/31* (2013.01); *B32B 2307/518* (2013.01); *B32B 2439/06* (2013.01); *Y10T 428/13* (2015.01); *Y10T 428/1328* (2015.01); *Y10T 428/1331* (2015.01); *Y10T 428/1334* (2015.01); *Y10T 428/1345* (2015.01); *Y10T 428/1352* (2015.01); *Y10T 428/1397* (2015.01)
(58) Field of Classification Search
  CPC ........ B32B 2250/244; B32B 2307/306; B32B 2307/31; B32B 2307/518; B32B 2439/06; B65D 65/40; Y10T 428/13; Y10T 428/1328; Y10T 428/1331; Y10T 428/1334; Y10T 428/1345; Y10T 428/1352; Y10T 428/1397
  See application file for complete search history.

(56) References Cited

U.S. PATENT DOCUMENTS

| 7,824,749 | B2* | 11/2010 | Dawes | B32B 7/12 |
| | | | | 428/35.7 |
| 2011/0200770 | A1* | 8/2011 | Uehara | B32B 25/14 |
| | | | | 428/35.2 |
| 2016/0090456 | A1* | 3/2016 | Ishimaru | C08G 63/60 |
| | | | | 428/156 |
| 2016/0108171 | A1 | 4/2016 | Haruta et al. | |
| 2017/0355497 | A1* | 12/2017 | Hashida | B65D 65/40 |

FOREIGN PATENT DOCUMENTS

| JP | H07-132946 A | 5/1995 | |
| JP | H11-322963 A | 11/1999 | |
| JP | 2004-223835 A | 8/2004 | |
| JP | 3817846 B2 | 9/2006 | |
| WO | WO-2014175313 A1 * | 10/2014 | ............ B32B 27/08 |
| WO | WO-2014185442 A1 * | 11/2014 | ........... C08G 63/183 |
| WO | WO-2016088581 A1 * | 6/2016 | ............... B32B 1/08 |

OTHER PUBLICATIONS

Androsch et al., "The link between rigid amorphous fraction and crystal perfection in cold-crystallized poly(ethylene terephthalate)," *Polymer*, 46(26):12556-12566 (2005).
Wunderlich, "Reversible crystallization and the rigid-amorphous phase in semicrystalline macromolecules," *Prog. Polym. Sci.*, 28(3): 383-450 (2003).
Japanese Patent Office, International Search Report in International Patent Application No. PCT/JP2018/004341 (May 1, 2018).
Indonesian Patent Office, Office Action in Indonesian Patent Application No. P00201907914 (Sep. 18, 2021).

* cited by examiner

POLYESTER SEALANT FILM, LAMINATE AND PACKAGE

CROSS-REFERENCE TO RELATED APPLICATIONS

This patent application is the U.S. national phase of International Patent Application No. PCT/JP2018/004341, filed Feb. 8, 2018, which claims the benefit of Japanese Patent Application No. 2017-025966, filed Feb. 15, 2017, which are incorporated by reference in their entireties herein.

TECHNICAL FIELD

The present invention relates to a polyester sealant having excellent heat sealing strength, and especially relates to a polyester sealant that has no curl and has excellent foldability, a laminate comprising the same and a packaging bag comprising them.

BACKGROUND ART

Conventionally, a laminated film obtained from heat-sealed or laminated sealant films has been used as packaging materials, such as a packaging bag and a lid member, for many of articles on markets represented by food, pharmaceuticals and industrial products. The innermost layer (a layer to be brought into contact with its content) of the packaging material is provided with a sealant layer made of a polyolefin resin such as polyethylene and polypropylene, an ionomer, or a copolymer resin such as EMMA which exhibit high sealing strength. These resins are known to be capable of achieving high adhesion strength through heat sealing.

However, an unstretched sealant film made of a polyolefin resin as described in Patent Document 1 is prone to adsorb a component made of organic compounds such as fat or oil and flavoring so that the unstretched sealant film has a disadvantage of easily changing the aroma or taste of its content. For that reason, it is unsuitable in many cases that a sealant layer made of a polyolefin resin is used as the innermost layer for packaging of a chemical product, a pharmaceutical, food or the like.

On the other hand, a sealant film made of an acrylonitrile resin as described in Patent Document 2 is less prone to adsorb an organic compound contained in a chemical product, a pharmaceutical, food or the like, thus being suitable for usage as the innermost layer of a packaging material. However, an acrylonitrile film has a problem of low heat sealing strength in a low temperature region (150° C. or lower). In a bag manufacturing process, when heat sealing temperature is high, a sealing bar requires more frequent maintenance. This is not preferred from a perspective of productivity. Also, a bag manufacturing line has been accelerated for the purpose of improving a yield of the bag manufacturing, rendering low sealing temperature preferable for such a need. A sealant made of an acrylonitrile resin fails to satisfy these demands.

Considering such problems, Patent Document 3 discloses a film containing 2,6-naphthalene dicarboxylic acid component and 1,3-propanediol component as a polyester sealant having non-adsorptivity against organic compounds. However, it has been a problem that, upon heat sealing, the sealant in Patent Document 3 melts (this means its heat resistance is low) and then has a hole thereon at the expense of its high heat sealing performance.

Patent Document 4 discloses a polyester sealant made of a heat sealing layer and a base layer. However, the sealant in Patent Document 4 has had a problem of curling towards the side of the heat sealing layer because it has the laminated layers of greatly different compositions. This is caused by a tendency of the sealant to shrink towards the heat sealing layer that has a high heat shrinkage ratio once the sealant is subjected to a heat fixing process after biaxial stretching. Additionally, the sealant in Patent Document 4 is inferior in foldability, thus causing a problem attributed to this. In recent years, functionality and design of packaging materials have been largely improved. For example, gussets are applied to bags in such a way as to achieve large capacity upon usage and compactness upon storage. When the gusset is applied, a sealant constituting a bag also requires foldability. However, the sealant in Patent Document 4 is inferior in foldability, thus having caused a problem of failing to have good folds.

PRIOR ART DOCUMENT

Patent Document

Patent Document 1: JP3817846B2
Patent Document 2: JPH07-132946A
Patent Document 3: JPH11-322963A
Patent Document 4: JP2004-223835A Non-Patent Document Non-Patent Document 1: B. Wunderlich, Prog. Polym. Sci., 28, 383-450 (2003)
Non-Patent Document 2: R. Androsch, B. Wunderlich, Polym., 46, 12556-12566 (2005)

SUMMARY OF INVENTION

Technical Problem

An object of the present invention is to solve the above problems of the conventional technique. That is, an object of the present invention is to provide a polyester sealant that is less prone to adsorb a component of its content; has not only high heat sealing strength in a low temperature region but also no hole thereon upon heat sealing; is little curl attributed to laminating; and is excellent in foldability. Simultaneously, an object of the present invention is to provide a laminate comprising at least one layer of the polyester sealant and provide a packaging bag comprising the laminate.

Solutions to Problem

The present invention has the following constitution.
1. A polyester sealant film having at least one of a heat sealing layer and a heat resistant layer, wherein each layer consists of a polyester component which comprises ethylene terephthalate as a main component,
wherein the polyester sealant film satisfies following requirements (1) to (6):
(1) a heat sealing strength of the heat sealing layers being heat-sealed to another heat sealing layer at 140° C. and 0.2 MPa for 2 seconds is 8 N/15 mm or more and 20 N/15 mm or less;
(2) the heat sealing layer has a difference in reversible heat capacity ($\Delta Cp$) between a glass transition temperature and 140° C. of 0.5 J/g/K or more and 1.1 J/g/K or less when measured with a temperature modulated DSC;
(3) the heat resistant layer has a ΔCp of 0.1 J/g/K or more and less than 0.6 J/g/K when measured with the temperature modulated DSC;
(4) the film has a fold holding angle of 20 degrees or more and 60 degrees or less;
(5) the film has a smaller curvature radius of 50 mm or more and 300 mm or less in a longitudinal direction or a widthwise direction; and
(6) the film has a heat shrinkage ratio of −5% or more and 5% or less in both a longitudinal direction and a widthwise direction after immersed in hot water of 80° C. for 10 seconds.

2. The polyester sealant film according to above 1, wherein the polyester component constituting the heat sealing layer comprises a diol monomer component other than ethylene glycol as a monomer component, and the polyester component constituting the heat resistant layer comprises a diol monomer component other than ethylene glycol as a monomer component; and
wherein the diol monomer component in the heat sealing layer and the heat resistant layer is at least one of neopentyl glycol, 1,4-cyclohexane dimethanol, 1,4-butanediol or diethylene glycol.

3. The polyester sealant film according to above 1 or 2, wherein the polyester component constituting the heat sealing layer comprises a diol monomer component other than ethylene glycol as a monomer component, and the polyester component constituting the heat resistant layer comprises a diol monomer component other than ethylene glycol as a monomer component; and
wherein a content of the diol monomer component relative to the monomer component in the heat sealing layer or the heat resistant layer satisfies following requirements (1) to (3):
(1) the content of the diol monomer component in the heat sealing layer is 30% or more by mol and 50% or less by mol;
(2) the content of the diol monomer component in the heat resistant layer is 9% or more by mol and 20% or less by mol; and
(3) a difference of the content of the diol monomer component between the heat sealing layer and the heat resistant layer is 20% or more by mol and 35% or less by mol.

4. A laminate comprising at least one layer of the polyester sealant film according to any one of above 1 to 3.

5. A packaging bag comprising the polyester sealant film according to any one of above 1 to 3 as at least a part thereof.

6. A packaging bag comprising the laminate according to above 4 as at least a part thereof.

Advantageous Effects of Invention

The polyester sealant according to the present invention not only has high heat sealing strength in a low temperature region but also has no hole thereon upon heat sealing, is little curl attributed to laminating and excellent in foldability.

The present invention can also provide a laminate comprising at least one layer of the polyester sealant and provide a packaging bag comprising the laminate.

DESCRIPTION OF EMBODIMENTS

A polyester sealant film according to the present invention has at least one of a heat sealing layer and a heat resistant layer, wherein each layer consists of a polyester component which comprises ethylene terephthalate as a main component,
wherein the polyester sealant film satisfies following requirements (1) to (6):
(1) a heat sealing strength of the heat sealing layers being heat-sealed to another heat sealing layer at 140° C. and 0.2 MPa for 2 seconds is 8 N/15 mm or more and 20 N/15 mm or less;
(2) the heat sealing layer has a difference in reversible heat capacity (ΔCp) between a glass transition temperature and 140° C. of 0.5 J/g/K or more and 1.1 J/g/K or less when measured with a temperature modulated DSC;
(3) the heat resistant layer has a ΔCp of 0.1 J/g/K or more and less than 0.6 J/g/K when measured with the temperature modulated DSC;
(4) the film has a fold holding angle of 20 degrees or more and 60 degrees or less;
(5) the film has a smaller curvature radius of 50 mm or more and 300 mm or less in a longitudinal direction or a widthwise direction; and
(6) the film has a heat shrinkage ratio of −5% or more and 5% or less in both a longitudinal direction and a widthwise direction after immersed in hot water of 80° C. for 10 seconds.

The polyester sealant according to the present invention that satisfies the above requirements is a polyester film that is excellent in a heat sealing property. Also, the polyester sealant is suitable for a packaging bag because it is less prone to adsorb various organic compounds. Furthermore, an excellent heat resistance of the polyester sealant prevents the polyester sealant from having a hole thereon upon heat sealing. In addition, the polyester film according to the present invention is little curl, thus being excellent in foldability.

In particular, the heat sealing property and the heat resistance are properties antinomic to each other. When an attempt has been made to overcome such a relationship, a problem of high tendency to cause a curl has arisen, and an improvement thereof is necessitated. There has conventionally been no polyester film that can solve all of these problems. Hereinafter, a polyester film according to the present invention will be described.

1. Layer Structure of Polyester Sealant

A polyester sealant according to the present invention needs to have at least one of a heat sealing layer and a heat resistant layer to achieve both a heat sealing property and a heat resistance. Structure requirements involving each layer will be described later, but a layer containing the larger amount of ethylene terephthalate component is the heat resistant layer. A preferred layer structurer of the polyester sealant is a two-kind two-layer structure comprising the heat sealing layer and the heat resistant layer.

The polyester sealant preferably has a layer ratio of the heat sealing layer of 20% or more and 80% or less. The polyester sealant having a layer ratio of the heat sealing layer of less than 20% is not preferred because its heat sealing strength decreases. The polyester sealant having a layer ratio of the heat sealing layer of more than 80% improves heat sealing property of the film but is not preferred in terms of a decrease in its heat resistance. The polyester sealant preferably has a layer ratio of the heat sealing layer of 30% or more and 70% or less.

The heat sealing layer and the heat resistant layer can be provided with a layer having been subjected to, for example, a corona treatment, coating or a flame treatment, to improve printability and slipperiness of a surface of the film, and any layer can be provided without departing from the requirements of the present invention.

2. Properties of Polyester Sealant 2.1. Heat Sealing Strength

It is preferred that a heat sealing strength of a polyester sealant according to the present invention is 8 N/15 mm or more and 20 N/15 mm or less when the heat sealing layers are heat-sealed to each other at a temperature of 140° C., with a sealing bar pressure of 0.2 MPa, for a sealing time of 2 seconds. If the heat sealing strength is less than 8 N/15 mm, a sealed portion is easily peeled, and the film cannot be used as a packaging bag. The heat sealing strength is preferably 9 N/15 mm or more and more preferably 10 N/15 mm or more. Although high heat sealing strength is preferred, a currently available upper limit is approximately 20 N/15 mm.

2.2. Difference in Reversible Heat Capacity

A polyester sealant according to the present invention uses, as an indicator of the heat sealing strength and the heat resistance, a difference in reversible heat capacity $\Delta Cp$ between a glass transition temperature (Tg) and 140° C. The reversible heat capacity can be measured with a heat only mode of a temperature modulated DSC. The heat sealing layer needs to have $\Delta Cp$ of 0.5 J/g·K or more and 1.1 J/g·K or less whereas the heat resistant layer needs to have $\Delta Cp$ of 0.1 J/g·K or more and 0.6 J/g·K or less.

Hereinafter, a concept of how the reversible heat capacity $\Delta Cp$ relates to the heat sealing strength and the heat resistance will be described.

Conventionally, heat sealing has been conceived as a technique that is worked out by melting a sealant. As described in Patent Document 1, lowering a melting point or a calorie of fusion of a sealant has been conceived to be effective in order to improve heat sealing strength. This is a design concept based upon conventional knowledge that heat resistance lowers as crystallinity decreases and thus heat sealing strength is improved. However, as a result of investigations by the present inventors on a relationship between a heat sealing property and crystallinity (melting point, calories of fusion) of a polyester sealant, it has been found that these properties do not always have correlation with each other. Also, it has been found that simply decreasing an amount of a crystalline component does not allow a uniaxially stretched film or a biaxially stretched film to achieve an increase in heat sealing strength that corresponds to the decrement amount and found that this tendency is particularly remarkable in a biaxially stretched film. In addition, it has been found that a polyester sealant may exhibit heat sealing strength even in temperature lower than its melting point (a temperature at which its crystals melt). From these facts, the present inventors conceived that not only crystal molecules but also amorphous molecules influence heat sealing.

Recent studies have explained that amorphous molecules of polyester can further fall into two categories according to their mobility (for example, B. Wunderlich, Prog. Polym. Sci., 28, 383-450 (2003) or R. Androsch, B. Wunderlich, Polym., 46, 12556-12566 (2005)). Therefore, molecular structure of polyester fall into three categories: crystal phase, mobile amorphous phase and rigid amorphous phase. The mobile amorphous phase is conventionally conceived amorphous molecules in which molecules are said to commence moving at glass transition temperature. Abundance ratio of the mobile amorphous phase can be quantified from a reversible heat capacity curve measured with a heat only mode of a temperature modulated DSC by determining a difference in reversible heat capacity before and after the commencement of glass transition. The rigid amorphous phase is assumed to be an intermediate between the mobile amorphous phase and a crystal phase, and is conceived to have intermediate mobility between that of the mobile amorphous phase and the crystal phase. The rigid amorphous phase is said to be a molecule that exhibits no glass transition unlike a mobile amorphous phase. However, from a perspective that its reversible heat capacity mildly increases between its glass transition and its melting point, a rigid amorphous phase is said to transform to a mobile amorphous phase in a temperature region after its glass transition. Therefore, it is conceived that motion of a mobile amorphous phase and a rigid amorphous phase caused by heat sealing allows heat sealing surfaces to adhere to each other, thus exhibiting heat sealing strength.

The present inventors considered a difference in reversible heat capacity that has increased between glass transition and heat sealing temperature to be variations of a mobile amorphous phase and a rigid amorphous phase, and examined their relationship with heat sealing strength. As a result, the present inventors have found that, on a heat sealing layer and a heat resistant layer, preferred heat sealing strength and heat resistance can be achieved by controlling the variations of a mobile amorphous phase and a rigid amorphous phase to be within respective predetermined ranges.

If a difference in reversible heat capacity $\Delta Cp$ of a heat sealing layer is less than 0.5 J/g·K, a mobile amorphous content and a rigid amorphous content necessary for the heat sealing layer cannot be met, and a heat sealing strength at 140° C. falls below 8 N/15 mm. On the other hand, a larger difference in reversible heat capacity $\Delta Cp$ of a heat sealing layer achieves more enhanced heat sealing strength of the heat sealing layer, but 1.1 J/g·K is the upper limit for the existing state of the art. More preferred $\Delta Cp$ range for a heat sealing layer is 0.55 J/g·K or more and 1.05 J/g·K or less. Smaller $\Delta Cp$ of a heat resistant layer achieves higher heat resistance of the heat resistant layer, but 0.1 J/g·K is the lower limit for the existing state of the art. On the other hand, if $\Delta Cp$ of a heat resistant layer is 0.6 J/g·K or more, a mobile amorphous content and a rigid amorphous content that move upon heat sealing increase to a degree that the layer fails to meet heat resistance necessary as a heat resistant layer. This is not preferred. More preferred $\Delta Cp$ range for the heat resistant layer is 0.15 J/g·K or more and less than 0.55 J/g·K.

2.3. Fold Holding Angle

A polyester sealant according to the present invention needs to have a fold holding angle of 20 degrees or more and 60 degrees or less that is measured with the method described later. The sealant having a fold holding angle of 70 degrees or more is less liable to have folds, when forming a bag, and thus suffers from poor appearance. The preferred upper limit of the fold holding angle is 55 degrees, and the more preferred upper limit is 50 degrees. A smaller fold holding angle is more preferred. However, a range of the fold holding angle that can be covered by the present invention is 20 degrees as its lower limit, so that even a fold holding angle of 25 degrees or more is recognized as being practically preferable.

2.4. Curvature Radius

A polyester sealant according to the present invention needs to have a curvature radius of 50 mm or more and 300 mm or less that is measured with the method described later. The sealant having a curvature radius of less than 50 mm is prone to have a large curl. The large curled sealant is not preferable because it may not only be poor appearance, but also may be bent in the bag manufacturing process to be heat-sealed. The preferred lower limit of a curvature radius is 55 mm, and the more preferred lower limit is 60 mm or more. On the other hand, a larger curvature radius is more preferred because it achieves a smaller curl. However, a range of the curvature radius that can be covered by the present invention is 300 mm as its upper limit so that even a curvature radius of 200 mm or less is recognized as being practically preferable.

2.5. Shrinkage Ratio

A polyester sealant according to the present invention needs to have a hot-water heat shrinkage ratio of −5% or more and 5% or less both in the widthwise direction and the longitudinal direction when treated in 80° C. hot water over 10 seconds. The sealant having a shrinkage ratio exceeding 5% shrinks largely under a high-temperature environment and thus becomes incapable to retain its original shape. A preferred hot-water heat shrinkage ratio is 4% or less and a more preferred hot-water heat shrinkage ratio is 3% or less. On the other hand, a sealant having a hot-water heat shrinkage ratio of lower than 0% means that the sealant is stretched and is not preferred because the sealant becomes incapable of retaining its original shape as is the case of having a high shrinkage ratio.

2.6. Haze

A polyester sealant according to the present invention preferably has a haze of 1% or more and 15% or less. The sealant having a haze exceeding 15% deteriorates its transparency and become inferior in visibility of its contents when formed into a packaging material such as a bag. The upper limit of the haze is more preferably 13% or less and particularly preferably 11% or less. A lower haze is preferred because it achieves higher transparency. However, the lower limit of the haze is 1% for the existing state of the art and even a haze of 2% and more is recognized as being practically sufficient.

2.7. Thickness

The thickness of a polyester film according to the present invention is preferably, but not limited to, 3 μm or more and 200 μm or less. The film having a thickness of lower than 3 μm is not preferred because such a thickness causes the film to have insufficient heat sealing strength and makes processing such as printing difficult. Although the film may have a thickness of more than 200 μm, such a film increases its usage weight and thus raise its chemical costs. This is not preferred. The thickness of the film is preferably 5 μm or more and 160 μm or less, and more preferably 7 μm or more and 120 μm or less.

3. Polyester Raw Materials Constituting Polyester Sealant

3.1. Kinds of Polyester Raw Materials

A polyester used in the present invention contains an ethylene terephthalate unit as a main component in both its heat sealing layer and its heat resistant layer. The phrase "containing an ethylene terephthalate unit as a main constituent component" refers to containing 50% or more by mol of the ethylene terephthalate unit when the whole amount of constituent components is defined as 100% by mol.

Further, a polyester used in the present invention that constitutes the heat sealing layer and the heat resistant layer preferably contains at least one component other than ethylene terephthalate. This is because the presence of a component other than ethylene terephthalate increases ΔCp and thus enhances the heat sealing strength of the polyester sealant. For the heat resistant layer, a smaller amount of a component other than ethylene terephthalate is more preferred. However, the heat resistant layer containing a component other than ethylene terephthalate can reduce a difference of a shrinkage ratio from that of the heat sealing layer and thus increases the curvature radius of the polyester sealant (that is, making its curl small). The content of each component will be described later because it varies between the heat sealing layer and the heat resistant layer. Examples of a carboxylic acid monomer that can be a component other than terephthalic acid constituting the ethylene terephthalate include aromatic dicarboxylic acid, such as isophthalic acid, 1,4-cyclohexanedicarboxylic acid, 2,6-naphthalenedicarboxylic acid and orthophthalic acid, aliphatic dicarboxylic acid, such as adipic acid, azelaic acid, sebacic acid and decanedicarboxylic acid, and alicyclic dicarboxylic acid. However, trivalent or higher carboxylic acid (such as trimellitic acid, pyromellitic acid and anhydride thereof) is preferably not contained in the polyester.

Further, example of a diol monomer that can be a component other than ethylene glycol constituting ethylene terephthalate include long chain diol, such as neopentyl glycol, 1,4-cyclohexane dimethanol, diethylene glycol, 2,2-diethyl 1,3-propanediol, 2-n-butyl-2-ethyl-1,3-propanediol, 2,2-isopropyl-1,3-propanediol, 2,2-di-n-butyl-1,3-propanediol, hexanediol and 1,4-butanediol, aliphatic diol, such as hexanediol, and aromatic diol, such as bisphenol A. However, diol having 8 or more carbon atoms (such as octanediol) or polyhydric alcohol of trivalence or higher (such as trimethylol propane, trimethylol ethane, glycerin and diglycerin) is preferably not contained in the polyester.

In addition, the polyester may contain polyester elastomer containing ε-caprolactone, tetramethylene glycol or the like as its constituent component. The polyester elastomer has an effect of lowering a melting point of a film, thus enabling its suitable usage for the heat sealing layer in particular.

Amongst these, usage of at least one selected from the group consisting of neopentyl glycol, 1,4-cyclohexane dimethanol, 1,4-butanediol and diethylene glycol increases the ΔCp of the heat sealing layer. This makes it easy for the heat sealing strength of the heat sealing layer to be 8 N/15 mm or more and thus is preferred. Usage of at least one selected from the group consisting of neopentyl glycol and 1,4-cyclohexane dimethanol is more preferred, and usage of neopentyl glycol is particularly preferred.

To a polyester film according to the present invention, various additives, for example, waxes, an antioxidant, an antistatic agent, a nucleating agent, a viscosity-reducing agent, a thermal stabilizer, a pigment for coloring, a coloring-preventing agent, an ultraviolet absorber and the like can be added, as necessary. In addition, fine particles as a lubricant that improves slipperiness of the film are preferably added at least to a surface layer of the film. Any fine particles can be selected as the fine particles. Examples of inorganic fine particles include silica, alumina, titanium dioxide, calcium carbonate, kaolin, barium sulfate and the like, and examples of organic fine particles include acrylic resin particles, melamine resin particles, silicone resin particles, crosslinked polystyrene particles and the like. The average particle size of the fine particles can be properly selected as necessary within a range of 0.05 to 3.0 μm measured with a coulter counter.

As a method for blending the particles into a polyester film according to the present invention, the particles can be added, for example, in any stage during the production of the polyester resin, but it is preferable to add the particles as slurry dispersed in ethylene glycol or the like in an esterification stage or a stage after the completion of transesterification and before the start of a polycondensation reaction, and then a polycondensation reaction is allowed to proceed. Also, there are a method of blending slurry of particles dispersed in ethylene glycol, water or other solvent with polyester resin raw materials using a vented kneading extruder, a method of blending dried particles with polyester resin raw materials using a kneading extruder, or the like.

Hereinafter, a preferred component contained in the heat sealing layer and the heat resistant layer will be described.

3.2. Content of Polyester Raw Materials Contained in Heat Sealing Layer

A polyester used for the heat sealing layer of the present invention preferably contains 30% or more by mol of dicarboxylic acid monomer and/or diol monomer that are to be a component other than terephthalic acid and ethylene glycol that constitute ethylene terephthalate. This content is more preferably 32% or more by mol and particularly preferably 34% or more by mol. Also, the upper limit of the contained monomer that is to be a component other than the ethylene terephthalate is 50% by mol.

It is not preferred for the following reasons that a monomer that is to be a component other than the ethylene terephthalate contained in the heat sealing layer is lower than 30% by mol. Even though a molten resin is quenched and solidified after extruded from a die, the molten resin crystalizes in subsequent stretching and heat fixing process. This decreases ΔCp and thus makes it difficult for a heat sealing strength to be 8 N/15 mm or more. On the other hand, when a monomer that is to be a component other than ethylene terephthalate contained in the heat sealing layer is 50% or more by mol, the heat sealing strength of a film can be increased. However, the heat resistance of the heat seal layer becomes extremely low, so the area around the seal portion is blocked (a phenomenon in which a region broader than intended is sealed due to a heat conduction from a heating member) when heat sealing. As a result, suitable heat sealing becomes difficult. A content of a monomer that is to be a component other than ethylene terephthalate is preferably 48% or less by mol and particularly preferably 46% or less by mol.

3.3. Content of Polyester Raw Material Contained in Heat Resistant Layer

A polyester used for the heat resistant layer of the present invention preferably contains 9% or more by mol of dicarboxylic acid monomer and/or diol monomer that are to be a component other than terephthalic acid and ethylene glycol that constitute ethylene terephthalate. This content is more preferably 10% or more by mol and particularly preferably 11% or more by mol. Also, the upper limit of the contained monomer that is to be a component other than ethylene terephthalate is 20% by mol. It is not preferable that the monomer that is to be a component other than ethylene terephthalate contained in the heat resistant layer is lower than 9% by mol because the curvature radius of the heat resistant layer becomes small. Regarding the monomer that is to be a component other than ethylene terephthalate, if a difference of the monomer content between the heat sealing layer and the heat resistant layer increases, a difference of the heat shrinkage ratio of each layer during heat fixing becomes large. This causes large shrinkage on a side of the heat sealing layer and thus curvature radius becomes small even though quenching after the heat fixing is intensified.

On the other hand, it is not preferable that the monomer that is to be a component other than the ethylene terephthalate contained in the heat resistant layer is 20% or more by mol because this deteriorates the heat resistance of the sealant such that the heat applied during the heat sealing causes a hole. A content of the monomer that is to be a component other than the ethylene terephthalate is more preferably 19% or less by mol and particularly preferably 18% or less by mol. Further, with regard to a content of the monomer for controlling a curvature radius, this monomer is to be a component other than the ethylene terephthalate, difference of the content between the heat sealing layer and the heat resistant layer is more preferably 20% or more by mol and 35% or less by mol and further preferably 21% or more by mol and 34% or less by mol in addition to the respective monomer content in each layer described above.

4. Conditions for Forming Polyester Film 4.1. Melt Extrusion

A polyester sealant according to the present invention can be obtained in a manner that polyester raw materials described in the above Section 3. "Polyester Raw Materials Constituting Polyester Film" are melt-extruded with separate extruders for the heat sealing layer and the heat resistant layer to form an unstretched laminated film and this film is then uniaxially or biaxially stretched in the prescribed method described below. A film obtained by biaxial stretching is more preferred. The polyester can be obtained, as described above, through polycondensation of a dicarboxylic acid component and a diol component whose kinds and amounts are selected to make the polyester appropriately contain a monomer that can be a component other than ethylene terephthalate. Also, two kinds or more chip-shaped polyesters can be mixed and used as raw materials of the film. When raw material resins are melt-extruded, it is preferable to dry polyester raw material of each layer by using a drier such as a hopper drier or a paddle drier, or a vacuum dryer. The polyester raw material of each layer is dried as described above, then melted at a temperature of 200 to 300° C. and extruded into a laminated film, by using an extruder. At the extrusion, any existing method can be adopted, such as a T-die method or a tubular method. Subsequently, the laminated film that is molten through extrusion can be quenched to give an unstretched laminated film. A method of quenching the molten resin that can be suitably adopted is a method of obtaining a substantially unoriented resin sheet by casting the molten resin on a rotary drum from a spinneret to quench and solidify the cast resin. The film may be stretched in at least either one of the lengthwise (longitudinal) direction and the lateral (widthwise) direction. Hereinafter described will be a sequential biaxial stretching method via lengthwise stretching-lateral stretching in which lengthwise stretching is performed first and then lateral stretching is performed. An adopted method, however, may be a lateral stretching-lengthwise stretching method in which the order of stretching is reversed because the main orientation direction is only changed. Alternatively, a simultaneous biaxial stretching method may be adopted.

4.2. Lengthwise Stretching

Stretching in the lengthwise direction may be performed by introducing an unstretched film into a lengthwise stretching machine in which a plurality of roll groups are successively arranged. In the lengthwise stretching, it is preferable to perform preliminary heating with a preheating roll until the film temperature reaches 65° C. to 90° C. The film having a temperature of lower than 65° C. is not preferred because the film becomes hard to be stretched during the stretching in the lengthwise direction and thus easily causes breakage. The film having a temperature of higher than 90° C. is not preferred because the film easily adhesively attaches to a roll and thus winds around the roll or easily makes the roll dirty in continuous production.

When the film temperature reaches 65° C. to 90° C., the lengthwise stretching is performed. The lengthwise stretch ratio may be set at 1 time or more and 5 times or less. A lengthwise stretch ratio of 1 time means no lengthwise stretching performed, so that the lengthwise stretch ratio is to be set at 1 time to obtain a lateral uniaxially stretched film and is to be set at 1.1 times or more to obtain a biaxially stretched film. The upper limit of the lengthwise stretch ratio may be any value. Too high a lengthwise stretch ratio, however, makes lateral stretching hard and thus easily causes breakage, so that the lengthwise stretch ratio is preferably 5 times or less.

Loosening the film in the longitudinal direction after the lengthwise stretching (relaxation in the longitudinal direction) enables reduction in shrinkage ratio of the film in the longitudinal direction that has been generated by the lengthwise stretching. Further, the relaxation in the longitudinal direction enables mitigation of bowing phenomenon (distortion) that occurs in a tenter. This is because the film is heated while gripped at both ends thereof in the film widthwise direction in subsequent processes such as lateral stretching and a final heat treatment, so that only a center portion of the film is shrunk in the longitudinal direction. The relaxation ratio in the longitudinal direction is preferably 0% or more and 70% or less (a relaxation ratio of 0% means no relaxation performed). The upper limit of the relaxation ratio in the longitudinal direction is determined according to raw materials used and conditions for the lengthwise stretching, so that the relaxation cannot be performed exceeding this upper limit. In a polyester sealant according to the present invention, the upper limit of the relaxation ratio in the longitudinal direction is 70%. The relaxation in the longitudinal direction can be performed by heating the lengthwise stretched film at a temperature of 65° C. to 100° C. or lower and adjusting the difference in speed of rolls. As heating means, any of a roll, near-infrared light, far-infrared light and a hot air heater can be employed. The relaxation in the longitudinal direction can not only be performed directly after the lengthwise stretching, but can also be performed by narrowing a gap between clips in the longitudinal direction during, for example, the lateral stretching (including a preheating zone) or the final heat treatment (in the relaxation at this timing, both ends in the film widthwise direction are also relaxed in the longitudinal direction so that bowing distortion is mitigated. Thus, the relaxation in the longitudinal direction can be performed at any timing. After the relaxation in the longitudinal direction (or the lengthwise stretching when the relaxation is not performed), the film is preferably once cooled and is preferably cooled with a cooling roll having a surface temperature of 20 to 40° C.

4.3. Lateral Stretching

It is preferable after the lengthwise stretching to perform the lateral stretching at a stretch ratio of about 3 to 5 times at 65° C. to 110° C. with the film gripped by clips at its both end edges in the widthwise direction in a tenter. Before performing the stretching in the lateral direction, it is preferable to perform preliminary heating, and the preliminary heating may be performed until the surface temperature of the film reaches 75° C. to 120° C.

After the lateral stretching, it is preferable to let the film pass through an intermediate zone in which active heating operation is not performed. A final heat treatment zone following a lateral stretch zone in the tenter has higher temperature than does the lateral stretch zone, so that heat of the final heat treatment zone (a hot blast itself or radiation heat) would flow into a lateral stretching process were it not for the intermediate zone. Without the intermediate zone, the temperature in the lateral stretch zone would not be stabilized. This not only deteriorates the thickness accuracy of the film but also makes the physical properties of the film, such as heat sealing strength and the shrinkage ratio, vary. Therefore, it is preferable to let the laterally stretched film pass through the intermediate zone for a prescribed space of time and then to perform the final heat treatment. It is important, in this intermediate zone, to block an accompanying flow that accompanies running of the film and a hot blast from the lateral stretch zone and the final heat treatment zone in such a manner that a piece of strip-shaped paper is hung in the almost completely vertical direction when the paper is hung down without the film passing through the intermediate zone. About 1 second to 5 seconds suffice for the passing time through the intermediate zone. A passing time of less than 1 second indicates insufficient length of the intermediate zone that makes the heat blocking effect short. On the other hand, a longer intermediate zone is more preferred but too long an intermediate zone makes the facility large so that a passing time of about 5 seconds suffices.

4.4. Final Heat Treatment

It is preferable to perform a heat treatment at a lateral stretching temperature or higher and 250° C. or lower in the final heat treatment zone after the film passes through the intermediate zone. The heat treatment exhibits no effect when the heat treatment temperature is lower than the lateral stretching temperature. A heat treatment temperature of lower than the lateral stretching temperature is not preferred because the 80° C. hot-water shrinkage ratio of the film becomes higher than 5%. The shrinkage ratio of the film lowers as the heat treatment temperature becomes high. A heat treatment temperature of higher than 250° C., however, is not preferred because such temperature increases the haze of the film to higher than 15%, or causes the film to melt and then drop into the tenter during the final heat treatment.

It is possible to reduce the shrinkage ratio in the widthwise direction by shrinking the distance between the clips in the tenter at any rate during the final heat treatment (relaxation in the widthwise direction). Therefore, it is preferable to perform the relaxation in the widthwise direction in a range of 0% or more and 10% or less in the final heat treatment (a relaxation ratio of 0% means no relaxation performed). The shrinkage ratio in the widthwise direction lowers as the relaxation ratio in the widthwise direction becomes high. However, the upper limit of the relaxation ratio (the shrinkage ratio of the film in the widthwise direction right after the widthwise stretching) is determined according to raw materials used, conditions for the stretching in the widthwise direction, and the heat treatment temperature so that the relaxation cannot be performed exceeding this upper limit. In a polyester sealant according to the present invention, the upper limit of the relaxation ratio in the widthwise direction is 10%. The passing time through the final heat treatment zone is preferably 2 seconds or more and 20 seconds or less. If the passing time is 2 seconds or less, the film passes through the heat treatment zone without the surface temperature of the film reaching a set temperature so that the heat treatment becomes meaningless. The heat treatment enhances its effect as the passing time becomes long so that the passing time is preferably 2 seconds or more, further preferably 5 seconds or more. Long passing time, however, requires a large facility. For this reason, passing time of 20 seconds or less practically suffices.

4.5. Cooling

After passing through the final heat treatment zone, it is preferred that the film is cooled by cooling air of 10° C. or higher and 30° C. or lower. At this time, it is preferable to enhance a cooling efficiency by lowering temperature of the cooling wind or increasing its speed in such a manner that actual temperature of the film at an exit of the tenter becomes lower than either glass transition temperature of the heat sealing layer or the heat resistant layer whichever is lower. The actual temperature refers to surface temperature of the film measured with a non-contact radiation thermometer. If actual temperature of the film at an exit of the tenter is higher than the glass transition temperature, the film suffers from heat-shrinkage upon release of both the end parts of the film that have been gripped. The film then curls towards the heat sealing layer having the high heat shrinkage ratio, thus decreasing its curvature radius. This is not preferred. Passing time through the cooling zone is preferably 2 seconds or more and 20 seconds or less. Passing time of 2 seconds or less lets the film pass through the cooling zone without its surface temperature reaching the glass transition temperature, thus decreasing its curvature radius. Longer passing time achieves a higher cooling effect so that passing time is preferably 2 seconds or more and more preferably 5 seconds or more. However, long passing time requires a large facility. For this reason, passing time of 20 seconds or less practically suffices. Thereafter, both the end parts of the film are cut and removed, and the film is simultaneously wound to give a polyester film roll.

EXAMPLES

Next, the present invention will be described more concretely by way of Examples and Comparative Examples. However, the present invention is by no means limited by modes of the Examples, and may appropriately be modified within a range not deviated from the gist of the present invention.

The methods of evaluating the films are as follows. When the longitudinal direction and the widthwise direction cannot be immediately identified due to, for example, a small area of a film, measurement may be performed by tentatively setting the longitudinal direction and the widthwise direction. Even when the longitudinal direction and the widthwise direction that have been tentatively determined are different from the true directions by 90 degrees, any particular problem never occurs.

<Evaluation Methods of Film>

[Heat Sealing Strength]

Heat sealing strength was measured in conformity with JIS Z1707. A specific procedure is briefly shown. Heat sealing layers of samples that had not been subjected to a coating treatment or a corona treatment were adhered to each other with a heat sealer. Sealing conditions were an upper bar temperature set to 140° C., a lower bar temperature set to 30° C., a pressure set to 0.2 MPa, and time set to 2 seconds. Adhesion samples were cut out so as to have a seal width of 15 mm. Peeling strength was measured by using a universal tensile strength tester "DSS-100" (available from Shimadzu Corporation) at a tensile speed of 200 mm/min. The peeling strength is shown in strength per 15 mm (N/15 mm).

[Difference in Reversible Heat Capacity $\Delta Cp$]

A reversible heat capacity curve was obtained in the following manner. Samples of heat sealing layers were weighted by 2.0±0.2 mg and put into a hermetic aluminum pan. The samples were then measured with a temperature modulated differential scanning calorimeter (DSC) "Q100" (available from TA Instruments) in MDSC (registered trademark) heat-only mode, at an average temperature rising speed of 5.0° C./min., and for a modulation period of 40 seconds. When a heat sealing layer or a heat resistant layer is obtained from a laminated film, a surface layer was shaved with a feather blade. Across section of the shaved film sample was observed with an electron scanning microscope (SEM) to verify whether any layer other than a desired layer was not shaved.

In the heat capacity curve obtained by the measurement, an inflection point was determined with an attached analysis software (TA Analysis, available from TA Instruments). Then, a difference in heat capacity between a low temperature side (glass transition commencement) and 140° C. at the inflection point (glass transition point) was determined as a difference in reversible heat capacity $\Delta Cp$ according to the following equation 1.

$$\text{Difference in Reversible Heat Capacity } \Delta Cp = Cp1 - Cp2 \quad \text{(Equation 1)}$$

where:

Cp1: heat capacity at 140° C.

Cp2: heat capacity on a low temperature side at a glass transition point

Here, heat capacity Cp2 on a low temperature side at the glass transition point was determined in the following manner. An extension line of the base line of the heat capacity curve on the low temperature side relative to Tg is drawn, and an intersection point thereof with a tangent line of the inflection point (Tg) was determined. A value of Y axis (reversible heat capacity) corresponding to the intersection point was read.

[Fold Holding Angle]

Figure 1:
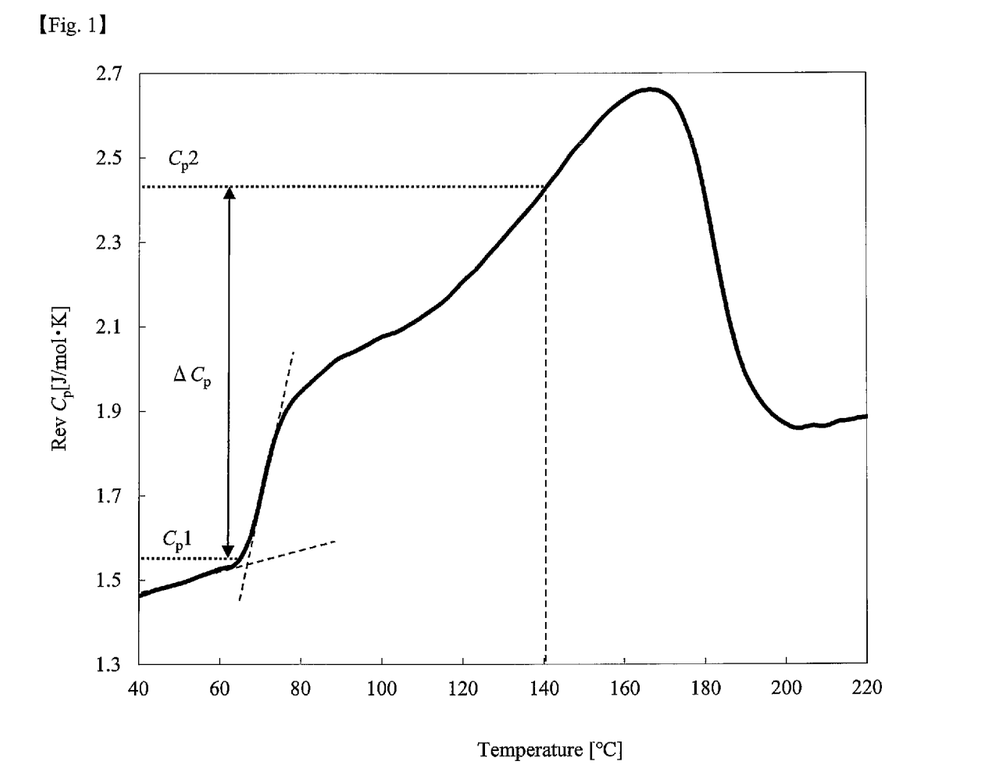
FIG. 1 shows a method for determining a difference in reversible heat capacity ΔCp on a heat sealing layer of Example 1 from a reversible heat capacity curve measured with a temperature modulated DSC.
Figure 2:
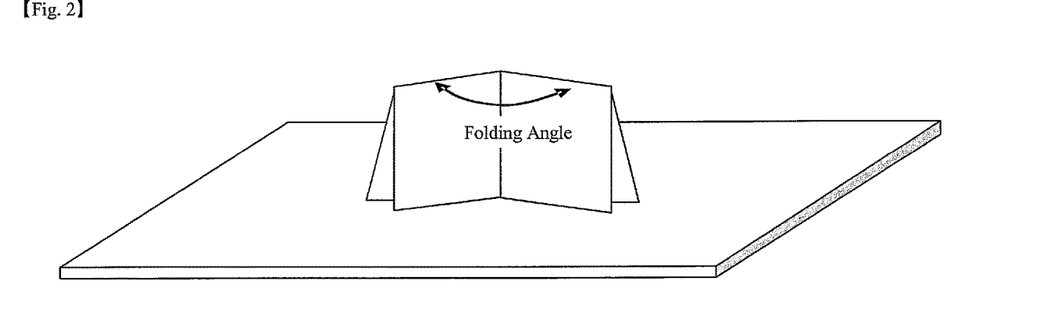
FIG. 2 is a schematic diagram showing a method for measuring a fold holding angle.

Films were left in a thermostatic chamber under an environment of 28° C. and 50% RH for 24 hours. Immediately after that, each of the films was cut into a 10 cm×10 cm square under an environment of 20° C. and 65% RH and folded in four (a 5 cm×5 cm square). When folding the film, the short sides of a rectangle that had been formed by initially folding the film in two were set to be a longitudinal direction. Subsequently, the four-folded film was sandwiched between 2 pieces of glass with a size of 10 cm×15 cm and a thickness of 2 mm. A 5 kg weight was then placed upon the glass for 10 seconds in order to press the film. After the weight was removed, an angle at which the folded film opened on a basis of the fold that was finally made was measured as shown in FIG. 2. The angle is 0 degree when the film is completely folded and is 180 degrees when the film is completely open.

[Curvature Radius]

Figure 3:
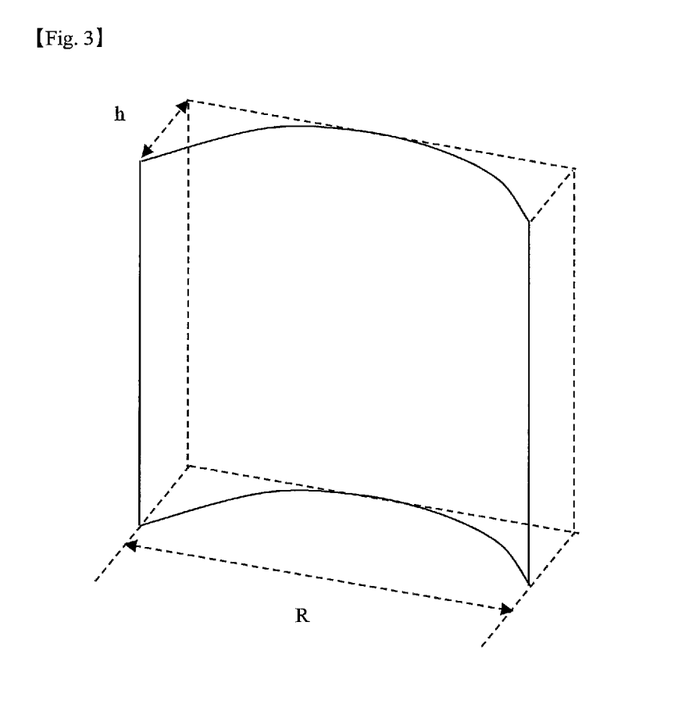
FIG. 3 is a schematic diagram showing a method for measuring a curvature radius.

Films were cut into a 5 cm×5 cm square and then the square was left under an environment of 28° C. and 50% RH for 1 minute in a free state (a state in which the square's own weight was not applied in its curling direction) as shown in FIG. 3. A curvature radius r (mm) was determined according to the following equation 2, measuring a sagitta (h) and a chord length (R) that were generated from a flexure of the film sample. A curvature radius was measured for both cases: one was that R in FIG. 3 was set to be a lengthwise direction of the film and the other was that R in FIG. 3 was set to be a widthwise direction of the same film. From these values calculated with the equation 2, the lower value was adopted.

$$\text{Curvature Radius } (r) \text{ (mm)} = (h \text{ (mm)}/2) + (1/8) \times (R \text{ (mm)}^2/h) \quad \text{(Equation 2)}$$

[Hot-Water Heat Shrinkage Ratio]

Films were cut into a 10 cm×10 cm square and immersed in 80±0.5° C. hot water with a no-load condition for 10 seconds to be shrunk. Thereafter, the films were immersed in 25° C.±0.5° C. water for 10 seconds and then taken out from water. Subsequently, the dimensions in the lengthwise and lateral directions of the film were measured, and the shrinkage ratio in each direction was determined according to the following equation 3. The measurement was performed twice and the average value of the measurements was determined.

$$\text{Shrinkage ratio} = \{(\text{Length before shrinkage} - \text{Length after shrinkage})/\text{Length before shrinkage}\} \times 100 \, (\%) \quad \text{(Equation 3)}$$

[Haze]

The haze was measured using a haze meter (300A available from NIPPON DENSHOKU INDUSTRIES CO., LTD.) in conformity with JIS-K-7136. The measurement was performed twice and the average value of the measurements was determined.

[Evaluation on Heat Resistance]

A heat sealing layer (surface) of a sample and an unstretched polyethylene terephthalate sheet (200 µm, a surface treatment such as a coating treatment and a corona treatment is not carried out) were arranged face to face and then heat sealed with a bar of a heat sealer. The heat sealing condition was an upper bar temperature set to 230° C., a lower bar temperature set to 30° C., a pressure set to 0.6 MPa and time set to 1 second. From a sealed line of the sealed sample, heat resistance was visually evaluated. The heat resistance was evaluated on a basis of whether the sample had a hole thereon with the following criterion.

| Evaluation Good | Having no hole |
| Evaluation Poor | Having a hole |

[Appearance After Being Left in High Temperature Environment]

Films were cut into a square of 10 cm×10 cm, and then placed into a thermo-hygrostat (IG400 available from Yamato Scientific Co., Ltd.) in which temperature and humidity were set to 80° C.165% RH, and left for 24 hours. After 24 hours, the sample was taken out, and the shrinkage ratio determined from the above equation 1 was calculated. In a case that the shrinkage ratio varied depending on a direction of the film, a shrinkage ratio in a direction in which the shrinkage was larger was adopted. This shrinkage rate was evaluated, according to the following criterion, as an appearance after being left in a high-temperature environment.

| Evaluation Good | A shrinkage ratio relative to the original shape was less than 5%. |
| Evaluation Fair | A shrinkage ratio relative to the original shape was 5% or more and 10% or less. |
| Evaluation Poor | A shrinkage ratio relative to the original shape was more than 10%. |

[Adsorptivity]

Films were cut into a square of 10 cm×10 cm, and weighed. Then, the film was soaked into a solution of 500 ml in a container that was prepared by adding ethanol to limonene (available from NACALAI TESQUE, INC.) and menthol (available from NACALAI TESQUE, INC.) in such a manner that concentration of each became 30%. The film was taken out a week later. The film taken out was pressed with a Bemcot to remove the solution, and dried for 1 day in a room of a temperature of 23° C. and humidity of 60% RH. After dried, the film was weighed, and a difference in film weight determined from the following equation 4 was defined as an adsorbed amount.

$$\text{Adsorbed amount} = \text{Film weight after soak} - \text{Film weight before soak} \quad \text{(Equation 4)}$$

This adsorbed amount was evaluated according to the following criterion.

| Evaluation Good | 0 mg or more and 5 mg or less |
| Evaluation Fair | more than 5 mg and equal to or less than 10 mg |
| Evaluation Poor | more than 10 mg |

<Preparation of Polyester Raw Materials>

Synthesis Example 1

A stainless steel autoclave equipped with a stirrer, a thermometer, and a partial circulation type cooler was filled with 100% by mol of dimethyl terephthalate (DMT) as a dicarboxylic acid component, and 100% by mol of ethylene glycol (EG) as a polyhydric alcohol component in such a way that ethylene glycol was 2.2 times the amount of dimethyl terephthalate by molar ratio. A transesterification reaction was then carried out by using 0.05% by mol (relative to the acid component) of zinc acetate as a transesterification catalyst, while generated methanol was distilled away from the system. Subsequently, 0.225% by mol (relative to the acid component) of antimony trioxide was added thereto as a polycondensation catalyst, and a polycondensation reaction was carried out at 280° C. under a reduced pressure of 26.7 Pa to give a polyester (A) having an intrinsic viscosity of 0.75 dl/g. This polyester (A) is polyethylene terephthalate. A composition of the polyester (A) is shown in Table 1.

Synthesis Example 2

In the same procedures as in Synthesis Example 1, polyesters (B) to (F) were obtained, but with a change in the monomers used. Table 1 shows the composition of each polyester. In Table 1, TPA represents terephthalic acid, BD represents 1,4-butanediol, NPG represents neopentyl glycol, CHDM represents 1,4-cyclohexane dimethanol, and DEG represents diethylene glycol. In the production of the polyester (F), SiO2 (Silysia 266 available from Fuji Silysia Chemical Ltd.) was added as a lubricant in a proportion of 7,000 ppm relative to the polyester. Each polyester was appropriately formed into a chip shape. The compositions of the polyesters (B) to (F) are shown in Table 1.

TABLE 1

Composition of Polyester Raw Material (mol %)

| Polyester Raw Material | Dicarboxylic Acid Component TPA | Diol Component EG | BD | NPG | CHDM | DEG | Addition Amount of Lubricant (ppm) |
|---|---|---|---|---|---|---|---|
| A | 100 | 99 | 0 | 0 | 0 | 1 | 0 |
| B | 100 | 68 | 0 | 30 | 0 | 2 | 0 |
| C | 100 | 66 | 0 | 24 | 0 | 10 | 0 |
| D | 100 | 67 | 0 | 0 | 30 | 3 | 0 |
| E | 100 | 0 | 100 | 0 | 0 | 0 | 0 |
| F | 100 | 99 | 0 | 0 | 0 | 1 | 7000 |

Example 1

The polyesters A, B, E, and F were mixed in a mass ratio of 10:6024:6 as raw materials for a heat sealing layer, whereas the polyesters A, B, E and F were mixed in a mass ratio of 57:31:6:6 as raw materials for a heat resistant layer.

The mixed raw materials for the heat sealing layer and the heat resistant layer were each fed into separate biaxial screw extruders and both the materials were melted at 270° C. The molten resins were bonded to each other by a feed block halfway through flow channels, then discharged from a T-die, and cooled on a chill roll set at a surface temperature of 30° C. to give an unstretched laminated film. The flow channels for the molten resins were set in such a manner that the laminated film had the heat sealing layer as its one side and had the heat resistant layer as the other side thereof (two-kind two-layer structure, heat sealing layer/heat resistant layer). The discharge amount was adjusted in such a manner that a thickness ratio between the heat sealing layer and the heat resistant layer became 50:50.

The unstretched laminated film that had been obtained by cooling and solidification was introduced into a lengthwise stretching machine in which a plurality of roll groups were successively arranged, was preliminarily heated until the film temperature reached 78° C. on a preheating roll, and then was stretched to 4.1 times. The film that had just been stretched lengthwise was allowed to enter a heating furnace set at 100° C. by a hot air heater, and a 20% relaxation treatment in the longitudinal direction was performed by making use of the difference in speed between rolls at an entrance and at an exit of the heating furnace. Subsequently, the lengthwise stretched film was forcibly cooled by a cooling roll set at a surface temperature of 25° C.

The relaxation-treated film was introduced into a lateral stretching machine (tenter), was preliminarily heated for 5 seconds until the surface temperature reached 105° C., and then was stretched in the widthwise direction (lateral direction) to 4.0 times. The laterally stretched film was directly introduced into an intermediate zone and allowed to pass through the zone in 1.0 second. In the intermediate zone of the tenter, a hot blast from a final heat treatment zone and a hot blast from a lateral stretch zone were blocked in such a manner that a piece of strip-shaped paper was hung in the almost completely vertical direction when the paper is hung down without the film passing through the intermediate zone.

Subsequently, the film that had passed through the intermediate zone was introduced into the final heat treatment zone and was heat-treated at 200° C. for 5 seconds. At this time, a 3% relaxation treatment in the widthwise direction was performed simultaneously with the heat treatment, by narrowing a gap between clips in the film widthwise direction. The film that had passed through the final heat treatment zone was cooled for 5 seconds by a cooling wind of 30° C. At this time, actual temperature of the film at an exit of the tenter was 35° C. Both edges of the film were cut and removed, and then the film was wound in a roll shape with a width of 500 mm to continuously produce a 30-μm-thick biaxially stretched film over a prescribed length. The characteristics of the film obtained were evaluated according to the methods described above. Production conditions and evaluation results are shown in Table 2 and Table 3 respectively.

Examples 2 to 8 and Comparative Examples 1 to 3

In Examples 2 to 8 and Comparative Examples 1 to 3, a heat sealing layer and a heat resistant layer were laminated with each other by the same method as Example 1. Then, polyester sealants were formed and evaluated in the same manner as in Example 1 except that blending ratio of raw materials, the conditions for the lengthwise stretching, the relaxation in the lengthwise direction, the lateral stretching, the final heat treatment and the cooling. The film production condition and characteristics in each Example are shown in Tables 2 and 3.

Comparative Example 4

In Comparative Example 4, Pylen Film-CT (registered trademark) P1 128-30 μm (available from Toyobo Co., Ltd.) was employed. The evaluation result is shown in Table 3.

TABLE 2

| | | Example 1 | Example 2 | Example 3 | Example 4 | Example 5 | Example 6 | Example 7 | Example 8 |
|---|---|---|---|---|---|---|---|---|---|
| Raw Material Composition of Heat Sealing Layer (mass %) | Polyester A | 10 | 10 | 10 | 26 | 26 | 0 | 10 | 10 |
| | Polyester B | 60 | 60 | 60 | 0 | 0 | 0 | 60 | 60 |
| | Polyester C | 0 | 0 | 0 | 0 | 0 | 68 | 0 | 0 |
| | Polyester D | 0 | 0 | 0 | 48 | 48 | 0 | 0 | 0 |
| | Polyester E | 24 | 24 | 24 | 20 | 20 | 26 | 24 | 24 |
| | Polyester F | 6 | 6 | 6 | 6 | 6 | 6 | 6 | 6 |
| Raw Material Composition of Heat Resistant Layer (mass %) | Polyester A | 57 | 47 | 60 | 60 | 47 | 57 | 57 | 57 |
| | Polyester B | 31 | 0 | 0 | 0 | 0 | 31 | 31 | 31 |
| | Polyester C | 0 | 0 | 30 | 30 | 0 | 0 | 0 | 0 |
| | Polyester D | 0 | 41 | 0 | 0 | 41 | 0 | 0 | 0 |
| | Polyester E | 6 | 6 | 0 | 0 | 6 | 6 | 6 | 6 |
| | Polyester F | 6 | 6 | 6 | 6 | 6 | 6 | 6 | 6 |
| Content of Monomer | Heat Sealing Layer | 41.1 | 41.1 | 41.1 | 34.0 | 34.0 | 48.3 | 41.1 | 41.1 |

TABLE 2-continued

|  |  |  |  |  |  |  |  |  |  |
|---|---|---|---|---|---|---|---|---|---|
| Component other than Ethylene Glycol (mol %) | Heat Resistant Layer | 14.6 | 18.0 | 10.3 | 10.3 | 18.0 | 14.6 | 14.6 | 14.6 |
|  | Difference (Heat Sealing Layer-Heat Resistant Layer) | 26.5 | 23.1 | 30.8 | 23.7 | 16.0 | 33.7 | 26.5 | 26.5 |
| Layer Structure |  | A/B | A/B | A/B | A/B | A/B | A/B | A/B | A/B |
| Extrusion Ratio of Raw Material Resin (Heat Sealing Layer (%)/Heat Resistant Layer (%)) |  | 50/50 | 50/50 | 50/50 | 50/50 | 50/50 | 50/50 | 50/50 | 50/50 |
| Lengthwise Stretching | Stretch Temperature (° C.) | 78 | 78 | 80 | 84 | 82 | 78 | 78 | 78 |
|  | Stretch Ratio | 4.1 | 4.1 | 4.1 | 4.1 | 4.1 | 4.1 | 4.1 | 4.1 |
| Relaxation in Longitudinal Direction | Heating Furnace Temperature (° C.) | 100 | 100 | 100 | 100 | 100 | 100 | 100 | 100 |
|  | Relaxation Ratio (%) | 20 | 20 | 20 | 20 | 20 | 20 | 20 | 20 |
| Lateral Stretching | Stretching Temperature (°C.) | 105 | 105 | 105 | 110 | 110 | 105 | 105 | 110 |
|  | Stretch Ratio | 4.0 | 4.0 | 4.0 | 4.0 | 4.0 | 4.0 | 4.0 | 4.5 |
| Final Heat Treatment | Temperature (° C.) | 200 | 200 | 200 | 200 | 200 | 200 | 160 | 220 |
|  | Relaxation Ratio in Widthwise Direction (%) | 3 | 3 | 3 | 3 | 3 | 3 | 5 | 3 |
|  | Cooling Temperature (° C.) | 30 | 30 | 30 | 30 | 30 | 30 | 30 | 30 |
|  | Temperature of Film at Exit (° C.) | 35 | 35 | 35 | 35 | 35 | 35 | 35 | 40 |
| Film Thickness (μm) |  | 30 | 30 | 30 | 30 | 30 | 30 | 30 | 30 |

|  |  | Example 9 | Example 10 | Comparative Example 1 | Comparative Example 2 | Comparative Example 3 | Comparative Example 4 |
|---|---|---|---|---|---|---|---|
| Raw Material Composition of Heat Sealing Layer (mass %) | Polyester A | 10 | 10 | 10 | 74 | 0 | P1128 |
|  | Polyester B | 60 | 60 | 60 | 0 | 0 |  |
|  | Polyester C | 0 | 0 | 0 | 0 | 68 |  |
|  | Polyester D | 0 | 0 | 0 | 10 | 0 |  |
|  | Polyester E | 24 | 24 | 24 | 10 | 26 |  |
|  | Polyester F | 6 | 6 | 6 | 6 | 6 |  |
| Raw Material Composition of Heat Resistant Layer (mass %) | Polyester A | 57 | 57 | 94 | 94 | 0 |  |
|  | Polyester B | 31 | 31 | 0 | 0 | 0 |  |
|  | Polyester C | 0 | 0 | 0 | 0 | 68 |  |
|  | Polyester D | 0 | 0 | 0 | 0 | 0 |  |
|  | Polyester E | 6 | 6 | 0 | 0 | 26 |  |
|  | Polyester F | 6 | 6 | 6 | 6 | 6 |  |
| Content of Monomer Component other than Ethylene Glycol (mol %) | Heat Sealing Layer | 41.1 | 41.1 | 41.1 | 11.8 | 48.3 |  |
|  | Heat Resistant Layer | 14.6 | 14.6 | 0.0 | 0.0 | 48.3 |  |
|  | Difference (Heat Sealing Layer-Heat Resistant Layer) | 26.5 | 26.5 | 41.1 | 11.8 | 0.0 |  |
| Layer Structure |  | A/B | A/B | A/B | A/B | A/B |  |
| Extrusion Ratio of Raw Material Resin (Heat Sealing Layer (%)/Heat Resistant Layer (%)) |  | 70/30 | 40/60 | 50/50 | 50/50 | 50/50 |  |
| Lengthwise Stretching | Stretch Temperature (° C.) | 78 | 78 | 82 | 85 | 75 |  |
|  | Stretch Ratio | 4.1 | 4.1 | 4.1 | 3.8 | 4.5 |  |
| Relaxation in Longitudinal Direction | Heating Furnace Temperature (° C.) | 100 | 100 | 100 | — | 100 |  |
|  | Relaxation Ratio (%) | 20 | 20 | 10 | 0 | 20 |  |
| Lateral Stretching | Stretching Temperature (°C.) | 100 | 110 | 110 | 110 | 100 |  |
|  | Stretch Ratio | 4.0 | 4.0 | 4.0 | 4.0 | 4.0 |  |
| Final Heat Treatment | Temperature (° C.) | 200 | 200 | 200 | 200 | 110 |  |
|  | Relaxation Ratio in Widthwise Direction (%) | 3 | 3 | 3 | 1 | 3 |  |
|  | Cooling Temperature (° C.) | 30 | 30 | 60 | 30 | 30 |  |
|  | Temperature of Film at Exit (° C.) | 35 | 35 | 72 | 35 | 30 |  |
| Film Thickness (μm) |  | 30 | 30 | 30 | 30 | 30 | 30 |

TABLE 3

Evaluation Result of Films

|  |  | Example 1 | Example 2 | Example 3 | Example 4 | Example 5 | Example 6 | Example 7 | Example 8 |
|---|---|---|---|---|---|---|---|---|---|
| Heat Sealing Strength (N/15 mm) |  | 14.3 | 13.2 | 14.8 | 9.3 | 9.2 | 16 | 14.7 | 15.5 |
| Difference in Reversible Heat Capacity (J/g · K) | Sealing Layer | 0.75 | 0.74 | 0.75 | 0.61 | 0.63 | 0.91 | 0.68 | 0.76 |
|  | Heat Resistant Layer | 0.41 | 0.51 | 0.39 | 0.39 | 0.55 | 0.41 | 0.47 | 0.38 |
| Folding Angle (Degree) |  | 32 | 32 | 34 | 35 | 33 | 32 | 42 | 31 |
| Curvature Radius (mm) | Longitudinal Direction | 77 | 98 | 69 | 80 | 108 | 56 | 102 | 66 |
|  | Widthwise Direction | — | — | — | — | — | — | — | — |
| 80° C. Hot-Water Shrinkage Ratio (%) | Longitudinal Direction | 0.8 | 0.9 | 0.8 | 0.6 | 0.7 | 1.1 | 1.3 | 0.3 |
|  | Widthwise Direction | 1.0 | 1.0 | 0.9 | 0.8 | 0.9 | 1.3 | 1.7 | 0.4 |
| Haze |  | 3.4 | 3.1 | 3.6 | 3.5 | 4.1 | 2.9 | 3.1 | 4.8 |
| Evaluation on Heat Resistance |  | Good | Good | Good | Good | Good | Good | Good | Good |
| Appearance after being Left in High-Temperature Environment |  | Good | Good | Good | Good | Good | Good | Fair | Good |
| Adsorptivity | Menthol | Good | Good | Good | Good | Good | Good | Good | Good |
|  | Limonene | Good | Good | Good | Good | Good | Good | Good | Good |

|  |  | Example 9 | Example 10 | Comparative Example 1 | Comparative Example 2 | Comparative Example 3 | Comparative Example 4 |
|---|---|---|---|---|---|---|---|
| Heat Sealing Strength (N/15 mm) |  | 13.4 | 14.6 | 16.3 | 0 | 12.1 | 11.7 |
| Difference in Reversible Heat Capacity (J/g · K) | Sealing Layer | 0.73 | 0.76 | 0.74 | 0.35 | 0.92 | 0.95 |
|  | Heat Resistant Layer | 0.39 | 0.40 | 0.25 | 0.25 | 0.93 | — |
| Folding Angle (Degree) |  | 29 | 35 | N.D. | 69 | 28 | 100 |
| Curvature Radius (mm) | Longitudinal Direction | 63 | 80 | — | — | — | — |
|  | Widthwise Direction | — | — | 18 | — | — | — |
| 80° C. Hot-Water Shrinkage Ratio (%) | Longitudinal Direction | 1.4 | 0.7 | 0.5 | 0.1 | 8.8 | 0.1 |
|  | Widthwise Direction | 1.3 | 1.0 | 0.6 | 0.1 | 16.3 | −0.1 |
| Haze |  | 3.0 | 3.1 | 3.5 | 4.6 | 3.1 | 3.5 |
| Evaluation on Heat Resistance |  | Good | Good | Good | Good | Poor | Poor |
| Appearance after being Left in High-Temperature Environment |  | Good | Good | Good | Good | Poor | Good |
| Adsorptivity | Menthol | Good | Good | Good | Good | Good | Poor |
|  | Limonene | Good | Good | Good | Good | Good | Poor |

According to Table 3, good evaluation results were obtained in any of the sealants of Examples 1 to 8, with ΔCp in a prescribed range, and excellence in heat sealing strength, a fold holding angle, a curvature radius, a shrinkage ratio, haze, heat resistance, an appearance after exposure to a high-temperature environment and adsorptivity. Incidentally, with regard to the sealants in Examples 1 to 10, a curvature radius in a widthwise direction could not be measured because the sealants had no curl in the widthwise direction.

On the other hand, the sealant in Comparative Example 1 suffered from a large curl owing to its small curvature radius although it was excellent in heat sealing strength, a shrinkage ratio, haze, heat resistance, appearance after exposure to a high-temperature environment and adsorptivity. Also, its fold holding angle could not be evaluated because the curl in widthwise direction was large (its curvature radius in longitudinal direction could not be measured because the sealant had no curl in the longitudinal direction).

The sealant in Comparative Example 2 suffered from a heat sealing strength of zero owing to small ΔCp of its heat sealing layer although it was excellent in a fold holding angle, a shrinkage ratio, haze, heat resistance, appearance after exposure to a high-temperature environment and adsorptivity. Incidentally, its curvature radius in longitudinal direction and widthwise direction could not be measured because the sealant in Comparative Example 2 had no curl in both the longitudinal direction and the widthwise direction.

The sealant in Comparative Example 3 was inferior in heat resistance owing to large ΔCp of its heat resistant layer although it was excellent in heat sealing strength, a fold holding angle and adsorptivity. In addition, the sealant in Comparative Example 3 had a high shrinkage ratio, leading to its poor appearance after being left in a high-temperature environment. Incidentally, its curvature radius in longitudinal direction and widthwise direction could not be measured because the sealant in Comparative Example 3 had no curl in both the longitudinal direction and the widthwise direction.

The sealant in Comparative Example 4 had a fold holding angle exceeding 60 degrees and also was inferior in heat resistance and adsorptivity although it was excellent in heat sealing strength, a shrinkage ratio, haze and appearance after exposure to a high-temperature environment.

INDUSTRIAL APPLICABILITY

The present invention relates to a polyester sealant that is less prone to adsorb a component of its content and is excellent in heat sealing strength in a low temperature region. Further, the polyester sealant has no hole thereon upon heat sealing, is little curled, and is excellent in foldability. Thus the polyester sealant can be suitably utilized as sealant use. Also, a laminate can comprise a polyester sealant according to the present invention as at least one of its layers with another film and such a laminate can be comprised in a packaging bag.

The invention claimed is:

1. A polyester sealant film consisting of a two-kind two-layer structure of a heat sealing layer and a heat resistant layer, wherein both the heat sealing layer and the heat resistant layer consist of a polyester component which comprises ethylene terephthalate as a main component, and wherein the polyester sealant film satisfies following requirements (1) to (6):
  (1) a heat sealing strength of the heat sealing layer being heat-sealed to another heat sealing layer of an identical polyester film at 140° C. and 0.2 MPa for 2 seconds is 8 N/15 mm or more and 20 N/15 mm or less;
  (2) the heat sealing layer has a difference in reversible heat capacity (ΔCp) between a glass transition temperature and 140° C. of 0.61 J/g/K or more and 1.1 J/g/K or less when measured with a temperature modulated DSC;
  (3) the heat resistant layer has a ΔCp of 0.1 J/g/K or more and less than 0.6 J/g/K when measured with the temperature modulated DSC;
  (4) the film has a fold holding angle of 20 degrees or more and 60 degrees or less;
  (5) the film has a curvature radius of 50 mm or more and 300 mm or less in either a longitudinal direction or a widthwise direction, whichever has a smaller curvature radius; and
  (6) the film has a heat shrinkage ratio of −5% or more and 5% or less in both a longitudinal direction and a widthwise direction after immersed in hot water of 80° C. for 10 seconds, wherein the polyester component constituting the heat sealing layer comprises a diol monomer component other than ethylene glycol as a monomer component, the polyester component constituting the heat resistant layer comprises a diol monomer component other than ethylene glycol as a monomer component;

the content of the diol monomer component in the heat sealing layer is 32% or more by mol and 50% or less by mol;

the content of the diol monomer component in the heat resistant layer is 9% or more by mol and 20% or less by mol; and a difference of the content of the diol monomer component between the heat sealing layer and the heat resistant layer is 20% or more by mol and 35% or less by mol.

2. The polyester sealant film according to claim 1, wherein the diol monomer component in the heat sealing layer and the heat resistant layer is at least one of neopentyl glycol, 1,4-cyclohexane dimethanol, 1,4-butanediol or diethylene glycol.

3. A laminate comprising at least one layer of the polyester sealant film according to claim 1.

4. A laminate comprising at least one layer of the polyester sealant film according to claim 2.

5. A packaging bag comprising the polyester sealant film according to claim 1 as at least a part thereof.

6. A packaging bag comprising the polyester sealant film according to claim 2 as at least a part thereof.

7. A packaging bag comprising the laminate according to claim 3 as at least a part thereof.

8. A packaging bag comprising the laminate according to claim 4 as at least a part thereof.

* * * * *